United States Patent
Orikasa et al.

(10) Patent No.: US 11,879,044 B2
(45) Date of Patent: Jan. 23, 2024

(54) POLYURETHANE FOAM AND METHOD FOR PRODUCING POLYURETHANE FOAM

(71) Applicants: ROGERS INOAC CORPORATION, Nagoya (JP); INOAC CORPORATION, Nagoya (JP)

(72) Inventors: Ayaka Orikasa, Aichi (JP); Takuya Kiriyama, Aichi (JP)

(73) Assignees: ROGERS INOAC CORPORATION, Nagoya (JP); INOAC CORPORATION, Nagoya (JP)

( * ) Notice: Subject to any disclaimer, the term of this patent is extended or adjusted under 35 U.S.C. 154(b) by 295 days.

(21) Appl. No.: 17/293,346

(22) PCT Filed: Nov. 7, 2019

(86) PCT No.: PCT/JP2019/043675
§ 371 (c)(1),
(2) Date: May 12, 2021

(87) PCT Pub. No.: WO2020/100711
PCT Pub. Date: May 22, 2020

(65) Prior Publication Data
US 2022/0010085 A1    Jan. 13, 2022

(30) Foreign Application Priority Data

Nov. 15, 2018  (JP) ................................. 2018-214444
Aug. 23, 2019  (JP) ................................. 2019-152865

(51) Int. Cl.
| | | |
|---|---|---|
| *C08J 9/04* | (2006.01) | |
| *C08K 3/26* | (2006.01) | |
| *C08K 9/06* | (2006.01) | |
| *C08J 9/00* | (2006.01) | |
| *C08G 18/12* | (2006.01) | |
| *C08G 18/63* | (2006.01) | |
| *C08G 18/72* | (2006.01) | |
| *C08J 9/12* | (2006.01) | |
| *C08J 9/30* | (2006.01) | |
| *C08K 3/36* | (2006.01) | |
| C08G 101/00 | (2006.01) | |

(52) U.S. Cl.
CPC ............ *C08J 9/0066* (2013.01); *C08G 18/12* (2013.01); *C08G 18/63* (2013.01); *C08G 18/72* (2013.01); *C08J 9/009* (2013.01); *C08J 9/122* (2013.01); *C08J 9/30* (2013.01); *C08K 3/26* (2013.01); *C08K 3/36* (2013.01); *C08K 9/06* (2013.01); *C08G 2101/00* (2013.01); *C08G 2110/0041* (2021.01); *C08J 2201/038* (2013.01); *C08J 2203/06* (2013.01); *C08J 2375/04* (2013.01); *C08K 2003/265* (2013.01)

(58) Field of Classification Search
CPC . C08J 9/0066; C08J 9/009; C08J 9/122; C08J 9/30; C08J 2201/038; C08J 2203/06; C08J 2375/04; C08G 18/12; C08G 18/63; C08G 18/72; C08G 2101/00; C08G 2110/0041; C08G 18/246; C08G 18/4288; C08G 18/48; C08K 3/26; C08K 3/36; C08K 9/06; C08K 2003/265; C08K 9/08; C08L 75/04; A43B 17/00
See application file for complete search history.

(56) References Cited

U.S. PATENT DOCUMENTS

2020/0079892 A1    3/2020  Omachi et al.

FOREIGN PATENT DOCUMENTS

| JP | H09-302273 A | * 11/1997 |
|---|---|---|
| JP | 2005120339 A | * 5/2005 |
| JP | 2009-13304 A | 1/2009 |
| WO | 2018/122940 A1 | 7/2018 |

OTHER PUBLICATIONS

Data Sheet for TS-720 silica from Cabot. (Year: 2017).*
International Search Report dated Dec. 10, 2019 issued by the International Searching Authority in counterpart International Application No. PCT/JP2019/043675 (PCT/ISA/210).
International Written Opinion dated Dec. 10, 2019 issued by the International Searching Authority in counterpart International Application No. PCT/JP2019/043675 (PCT/ISA/237).

* cited by examiner

Primary Examiner — K. Boyle
(74) Attorney, Agent, or Firm — Sughrue Mion, PLLC

(57) ABSTRACT

A polyurethane foam of the present disclosure is obtained from a polyurethane raw material containing a polyol component and a polyisocyanate component, and a gas for foaming. The polyurethane raw material contains a hydrophobic silica as a foam retention agent for retaining a foam and a light calcium carbonate, and a blending amount of the light calcium carbonate is 10 parts by weight or more based on 100 parts by weight of the polyol component.

12 Claims, 1 Drawing Sheet

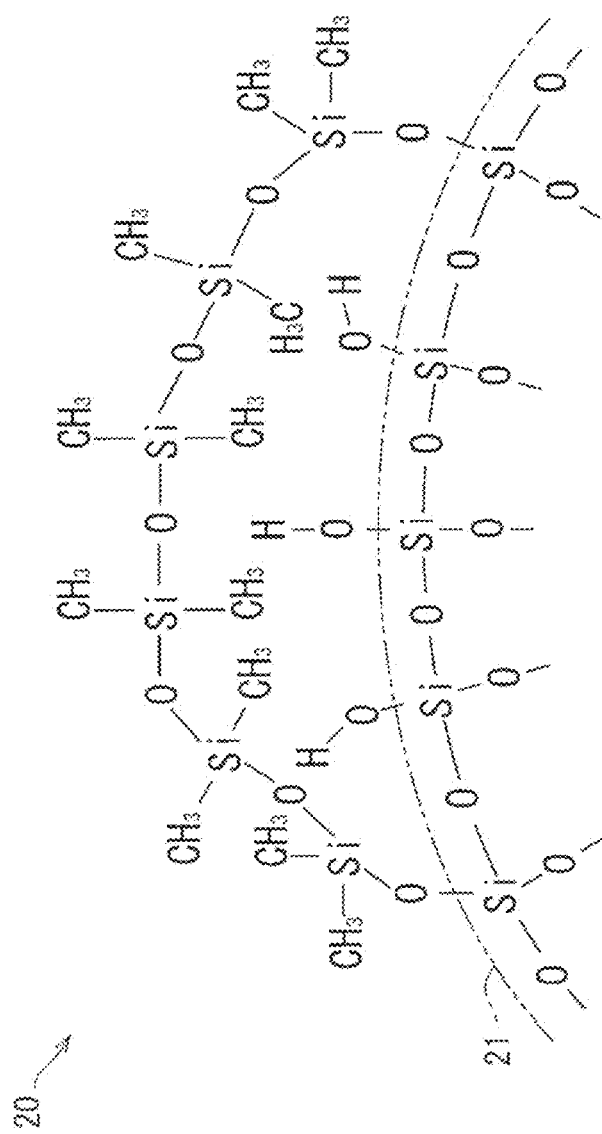

POLYURETHANE FOAM AND METHOD FOR PRODUCING POLYURETHANE FOAM

CROSS-REFERENCE TO RELATED APPLICATIONS

This application is a National Stage of International Application No. PCT/JP2019/043675 filed Nov. 7, 2019, claiming priority based on Japanese Patent Application No. 2018-214444, filed Nov. 15, 2018, and Japanese Patent Application No. 2019-152865, filed Aug. 23, 2019, the contents of all of which are incorporated herein by reference in their entirety.

TECHNICAL FIELD

The present invention relates to a polyurethane foam and a method for producing a polyurethane foam.

BACKGROUND ART

Patent Literature 1 discloses a mechanical froth method as a method for producing a polyurethane foam (for example, the paragraph [0008] to [0009] of the Patent Literature 1). In the mechanical froth method, bubbles are formed by mechanically and forcibly mixing an inert gas into a polyurethane raw material containing a polyol component, a polyisocyanate component, a foam stabilizer and the likes.

CITATION LIST

Patent Literature

Patent Literature 1: JP-A-2009-13304

SUMMARY OF INVENTION

Technical Problem

In the mechanical froth method, since the density, hardness and the likes of the polyurethane foam can be easily adjusted, a polyurethane foam suitable for various uses can be produced. For example, a polyurethane foam used as an impact absorbing material is known, but further improvement in impact absorption property is required.

Solution to Problem

An aspect of the present invention is a polyurethane foam obtained from a polyurethane raw material containing a polyol component and a polyisocyanate component, and a gas for foaming, in which the polyurethane raw material contains a hydrophobic silica as a foam retention agent for retaining a foam and a light calcium carbonate, and in the polyurethane raw material, a blending amount of the light calcium carbonate is 10 parts by weight or more and 180 parts by weight or less and a blending amount of the hydrophobic silica is 0.6 part by weight or more, based on 100 parts by weight of the polyol component.

Another aspect of the present invention is a method for producing the polyurethane foam according to the above aspect of the invention, in which the polyurethane foam from the polyurethane raw material and the gas for foaming by using a mechanical froth method.

BRIEF DESCRIPTION OF DRAWINGS

The Figure is a conceptual diagram showing a molecular structure near the surface of a hydrophobic silica contained in a polyurethane foam according to an embodiment.

DESCRIPTION OF EMBODIMENTS

A polyurethane foam according to the present embodiment is obtained from a polyurethane raw material containing a polyol component, a polyisocyanate component and a foam stabilizer, and a gas for foaming. It is preferable that the polyurethane raw material does not contain water and a foaming agent.

As the polyol component, a polyether polyol, a polyester polyol, a polyether ester polyol obtained by copolymerizing a polyether polyol and a polyester polyol, or the like can be used. Further, a polymer polyol can be used in combination for the purpose of forming a foam having sufficient tensile strength and the like. This polymer polyol is a polyol obtained by graft-polymerizing an ethylenically unsaturated compound such as acrylonitrile, styrene or methyl methacrylate with a polyether polyol in an amount of 10 mass % to 40 mass %, and preferably 15 mass % to 30 mass %, in terms of solid content with respect to the polymer polyol. Various polymer polyols can be used without particular limitation. The various polyols described above may be used alone or in combination of two or more thereof.

The polyol component may contain a plant-derived polyol in addition to the polyol described above. Examples of the plant-derived polyol include a castor oil-based polyol, a soybean oil-based polyol, a palm oil-based polyol and a cashew oil-based polyol. Examples of the castor oil-based polyol include castor oil, a reaction product of castor oil and a polyol, and an esterification reaction product of a castor oil fatty acid and a polyol. Examples of the polyol that reacts with castor oil or a castor oil fatty acid include divalent polyols such as ethylene glycol, diethylene glycol and propylene glycol, or trivalent or higher polyols such as glycerin, trimethylolpropane, hexanetriol and sorbitol. A blending ratio of the castor oil-based polyol is preferably 20 mass % to 80 mass % based on the entire polyol component. Examples of the soybean oil-based polyol include a polyol derived from soybean oil, for example, a reaction product of soybean oil and a polyol, an esterification reaction product of a soybean oil fatty acid and a polyol, and the like. As the polyol that reacts with soybean oil or a soybean oil fatty acid, the same polyol as in the case for the castor oil can be used. The same applies to the palm oil-based polyol and the cashew oil-based polyol, similar to the soybean oil-based polyol. The various polyols exemplified above as the plant-derived polyol may be used alone or in combination of two or more thereof.

As the polyisocyanate component, tolylene diisocyanate (TDI), crude TDI, 4,4'-diphenylmethane diisocyanate (MDI), crude MDI and the like are often used. In addition, various aromatic and aliphatic polyisocyanates such as 1,6-hexamethylene diisocyanate (HDI), crude HDI, 1,5-naphthalene diisocyanate, paraphenylene diisocyanate, 2,2,4-trimethylhexamethylene diisocyanate, 2,4,4-trimethylhexamethylene diisocyanate, 4,4'-dicyclohexylmethane diisocyanate, m-xylene diisocyanate, hexamethylene diisocyanate, hydrogenated MDI, isophorone diisocyanate, 2,4-tolylene diisocyanate, 2,6- tolylene diisocyanate, m-phenylene diisocyanate, p-phenylene diisocyanate, 2,4'-diphenylmethane diisocyanate, 2,2'-diphenylmethane diisocyanate, xylylene diisocyanate, 3,3'-dimethyl-4,4'-biphenylene diisocyanate, 3,3'-dimethoxy-4,4'-biphenylene diisocyanate, cyclohexane-1,4-diisocyanate, methylcyclohexanediisocyanate, butane-1,4-diisocyanate, isopropylene diisocyanate, methylene diisocyanate, lysine isocyanate, 1-methylbenzen-2,4,6-triisocyanate, 1,3,5,-trimethylbenzen-2,4,6-triisocyanate, diphenyl-2,4,4'-triisocyanate, diphenylmethane-2,4,4'-triisocyanate, methyldiphenylmethane-2,6,4'-triisocyanate, 4,4'-dimethyldiphenylmethane-2,2',5,5'-tetraisocyanate, triphenylmethane-4,4',4''-triisocyanate and polymethylene polyphenyl isocyanate, can be used. In addition to these, a prepolymer type polyisocyanate can also be used. The polyisocyanate described above may be used alone or in combination of two or more thereof. The polyisocyanate component is blended such that the isocyanate index is 80 to 120, and preferably 90 to 110.

It is particularly useful that the foam stabilizer is an organic silicone surfactant. A preferred organic silicone surfactant is a copolymer that is basically composed of a $SiO_2$ (silicate) unit and a $(CH_3)_3SiO_{0.5}$ (trimethylsiloxy) unit. The molar ratio of the silicate unit to the trimethylsiloxy unit is 0.8:1 to 2.2:1, and preferably 1:1 to 2.0:1. Another preferred organic silicone surfactant is a partially crosslinked siloxane-polyoxyalkylene block copolymer and a mixture thereof. The siloxane block and the polyoxyalkylene block are bonded to carbon via silicon or to an oxygen-carbon bond via silicon. The siloxane block contains a hydrocarbon- siloxane group and has an average of at least divalent silicon for each block bonded by the bond. At least a part of the polyoxyalkylene block contains an oxyalkylene group and at least a part of the polyoxyalkylene block is polyvalent. That is, at least a part of the polyoxyalkylene block has at least one of at least divalent carbon and carbon-bonded oxygen for each block bonded by the bond. The remaining polyoxyalkylene block contains an oxyalkylene group and the remaining polyoxyalkylene block is monovalent. That is, the remaining polyoxyalkylene block has at least one of monovalent carbon and carbon-bonded oxygen for each block bonded by the bond. Further, common organic polysiloxane-polyoxyalkylene block copolymers, such as those described in U.S. Pat. No. 2,834,748 specification, U.S. Pat. No. 2,846,458 specification, U.S. Pat. No. 2,868,824 specification, U.S. Pat. No. 2,917,480 specification and U.S. Pat. No. 3,057,901 specification can be used. The amount of the organic silicone surfactant used as the foam stabilizer can vary over a wide range, for example 0.5 mass % to 10 mass % or more based on the amount of an active hydrogen component. Preferably, the amount of the organic silicone surfactant present in the foam composition varies from 1.0 mass % to 6.0 mass % on the same basis.

In the present embodiment, the polyurethane raw material contains inorganic silica as a foam retention agent for retaining a foam. The foam retention agent is particularly preferably a hydrophobic silica. The hydrophobic silica is formed, for example, by subjecting silica particles to a surface treatment (hydrophobic treatment) with a hydrophobic treatment agent.

The silica as a base (hereinafter, referred to as base silica) before the surface treatment with the hydrophobic treatment agent may be a wet silica (for example, precipitation silica, gel silica) or a dry silica (for example, fumed silica). The base silica has a large number of hydrophilic silanol groups on the surface and is hydrophilic.

The hydrophobic treatment agent is preferably a silicone oil. Examples of the silicone oil include dimethyl silicone oil, methyl phenyl silicone oil, chloro silicone oil, chlorophenyl silicone oil, methyl hydrogen silicone oil, amino-modified silicone oil, epoxy-modified silicone oil, fatty acid ester-modified silicone oil, carboxylic acid-modified silicone oil, polyether-modified silicone oil, and alkyl-modified silicone oil. As the hydrophobic treatment agent, for example, a silane coupling agent, alkylsilazane (for example, hexamethyldisilazane and vinylsilazane) and the like can also be used.

The Figure shows a conceptual diagram of a hydrophobic silica (reference numeral 20) in which a silicone oil is used as the hydrophobic treatment agent. In the example of the FIGURE, dimethyl silicone oil (dimethylpolysiloxane) is used as the silicone oil for subjecting the base silica (reference numeral 21) to a surface treatment.

It is considered that, in the surface treatment with the silicone oil, for example, when a siloxane bond (—Si—O—Si—) in the silicone oil is broken by heating or the like, an organosilicon compound having a silanol group (—Si—O—H) (for example, organopolysiloxane and trialkylsilanol) is generated (Formula (1)), and the organosilicon compound and the base silica are siloxane-bonded by dehydration condensation of silanol groups (Formula (2)). Thus, it is considered that, when the base silica is subjected to a surface treatment with the hydrophobic treatment agent, the number of hydrophilic silanol groups on the surface of the base silica is reduced by the reaction (the hydrophobic groups are increased on the silica surface), so that the silica can be made hydrophobic. In the Formulae (1) and (2), each R represents an organic group and may be the same as or different from each other. In the hydrophobic silica, the silanol groups on the surface of the base silica may simply be covered with the hydrophobic treatment agent without reacting with the hydrophobic treatment agent.

[Chem. 1]

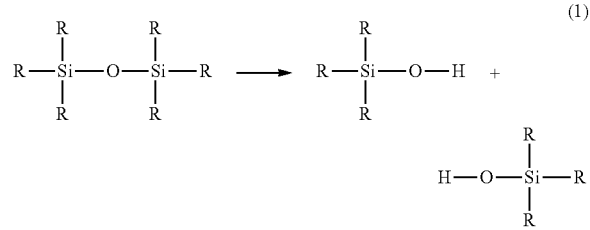

(1)

[Chem. 2]

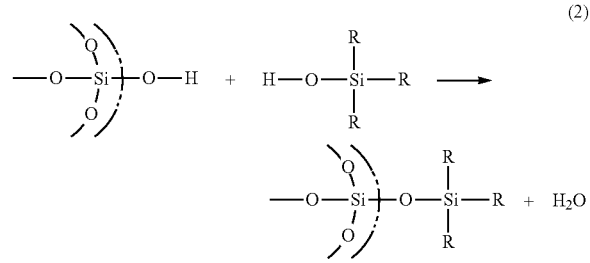

(2)

The methanol wettability (M value) of the hydrophobic silica is preferably 20% or more, and more preferably 40% or more. The M value is the volume % of methanol based on the entire mixed solution of water and methanol when a silica powder begins to precipitate in a case where the silica powder is added to the mixed solution. The higher the M value, the higher the hydrophobicity. The M value of the base silica that has not been subjected to a hydrophobic treatment is 0. Specifically, in measuring the M value, 0.1 g to 0.2 g of silica powder is added to 5 ml of a mixed solution of water and methanol, and the mixture is shaken twice, then the presence or absence of precipitation of the silica powder is confirmed.

The DBA (di-n-butylamine) absorption amount of the hydrophobic silica is preferably 100 mmol/kg or less, and more preferably 60 mmol/kg or less. The DBA adsorption amount is the amount of DBA adsorbed by the silanol groups on the silica surface. A low DBA adsorption amount indicates that the silanol groups on the silica surface are changed to siloxane bonds or are covered with the silicone oil, making it difficult for DBA to be adsorbed, and generally means a high hydrophobicity. The DBA adsorption amount of the base silica not subjected to a hydrophobic treatment is 200 mmol/kg or more. Specifically, the DBA adsorption amount can be obtained as follows. To 250 mg of a dried silica powder, 50 ml of an N/500 di-n-butylamine solution (petroleum benzine solvent) is added, and the mixture is shaken for 1 hour. Then, an ethanol mixture obtained by adding 10 ml of ethanol to 25 ml of the supernatant of the mixture is titrated with an N/100 perchloric acid solution (acetic anhydride solvent) using an automatic potential difference titrator, and the titration value is defined as A (ml). Separately, an ethanol mixture (blank) obtained by adding 10 ml of ethanol to 25 ml of the above N/500 di-n-butylamine solution is titrated with an automatic potential difference titrator in the same manner as above, and the titration value is defined as B (ml). Then, the DBA adsorption amount (mmol/kg) is calculated by the following Equation ($\alpha$). f is the titer of the N/100 perchloric acid solution.

$$\text{DBA adsorption amount} = 80 \times (B - A) \times f \qquad (\alpha)$$

For the hydrophobic silica, the elution rate of the hydrophobic treatment agent into toluene is preferably less than 0.2 mass % based on the mass of the hydrophobic silica. This elution rate is a proportion of the elution amount of the hydrophobic treatment agent based on the mass of the hydrophobic silica before dispersion when the hydrophobic silica is dispersed in toluene at a concentration of 2% and allowed to elapse at 20° C. for 24 hours. It is considered that the lower the elution rate of the hydrophobic treatment agent into toluene, the smaller the amount of the hydrophobic treatment agent that has not reacted with the silanol groups on the silica surface.

The hydrophobic silica preferably contains 3 to 9 parts by weight of the silicone oil based on 100 parts by weight of the base silica having a BET specific surface area of 100 m²/g. In addition, the hydrophobic silica preferably has a particle size of 10 μm to 400 μm.

For the hydrophobic silica, the contact angle of water with respect to the hydrophobic silica is preferably 145 degrees or more, and more preferably 160 degrees or more. The contact angle of water with respect to the hydrophobic silica can be measured by forming a powder of the hydrophobic silica into a film or the like and dropping water droplets on the surface thereof.

As the hydrophobic silica, a commercially available product can be used. Examples thereof include "Nipsil (registered trademark)" SS series (e.g., SS-10, SS-20, SS-40, SS-50, SS-50A, SS-70, SS-80K, SS-80S, SS-100, SS-115, and SS-178) manufactured by Tosoh Silica Corporation, "Nipgel (registered trademark)" series (e.g., AY-200, AZ-400, BZ-400, and CY-200) manufactured by Tosoh Silica Corporation, "AEROSIL (registered trademark)" series manufactured by EVONIC Industries, "HDK (registered trademark)" series manufactured by Wacker Asahikasei Silicone Co., Ltd., "CAB-O-SIL (registered trademark)" series manufactured by Cabot Corporation, and "QSG" series manufactured by Shin-Etsu Chemical Co., Ltd. The above commercially available product may be used alone or in combination of two or more thereof.

The gas for foaming is not particularly limited as long as it is inert to the polyol component and the polyisocyanate component, and may be an inert gas such as nitrogen gas or argon gas, or may be dry air.

The polyurethane raw material may contain a filler, a catalyst, a cross-linking agent and the like in addition to the polyol component, the polyisocyanate component, the foam stabilizer and the foam retention agent.

Examples of the filler include a thickener, a colorant, and an antistatic agent. The polyurethane raw material according to the present embodiment contains a light calcium carbonate as a functional filler. The light calcium carbonate preferably has a particle size of 0.08 μm to 5.0 μm.

As a catalyst, an amine-based catalyst and a metal catalyst (organic metal compound-based catalyst) for polyurethane foam are used alone or in combination. Examples of the amine-based catalyst include a monoamine compound, a diamine compound, a triamine compound, a polyamine compound, a cyclic amine compound, an alcohol amine compound and an ether amine compound. These amine-based catalysts may be used alone or in combination of two or more thereof. Examples of the metal catalyst include an organotin compound, an organobismuth compound, an organolead compound, and an organozinc compound. These catalysts may be used alone or in combination of two or more thereof.

Examples of the cross-linking agent include a low molecular weight compound having 2 to 4 active hydrogen-containing groups capable of reacting with isocyanate groups and having a number average molecular weight of 50 or more and 800 or less. Examples of the low molecular weight compound used as the cross-linking agent include ethylene glycol, diethylene glycol, propylene glycol, dipropylene glycol, 1,4-butanediol, 1,6-hexanediol, neopentyl glycol, glycerin, trimethylolpropane, triethanolamine and pentaerythritol. These low molecular weight compounds may be used alone or in combination of two or more thereof.

The polyurethane foam according to the present embodiment is produced by mixing the polyurethane raw material and the gas for foaming with stirring, then heating the mixture, and reacting and curing the polyol component and the polyisocyanate component. Specifically, the polyurethane raw material is supplied into a chamber, the gas for foaming is also supplied into the chamber, and the mixture is stirred by a stirrer such as an oaks mixer or a hobert mixer to perform gas-liquid mixing. At this time, bubbles are formed in the gas-liquid mixture. Then, this gas-liquid mixture is discharged into a molding mold or onto a carrier film. Then, the gas-liquid mixture is heated to a required temperature, and the polyol component and the polyisocyanate component are reacted and cured to form the polyurethane foam. In the case of being discharged into the molding mold, the gas-liquid mixture is cooled and then taken out from the molding mold to obtain a polyurethane foam having a predetermined shape. In the case where the gas-liquid mixture is discharged onto the carrier film, the carrier film is removed after cooling, and the obtained foam sheet is punched out to obtain a polyurethane foam having a predetermined shape.

Here, when the blending amount of the light calcium carbonate is small, the foaming property when the polyurethane raw material and the gas for foaming are mixed and stirred is deteriorated, and it is difficult for bubbles to be formed in the gas-liquid mixture. In addition, when the blending amount of the light calcium carbonate is large, the foam retention property is deteriorated, and when the blending amount is further large, the raw material may become a paste and stirring may be difficult. The blending amount of the light calcium carbonate in the present embodiment is 10 parts by weight or more and 180 parts by weight or less when the polyol component is 100 parts by weight. The lower limit of the blending amount of the light calcium carbonate is preferably 40 parts by weight or more on the same basis. The upper limit of the blending amount of the light calcium carbonate is preferably 150 parts by weight or less, more preferably 140 parts by weight or less, and still more preferably 100 parts by weight or less.

Further, even when the amount of the light calcium carbonate is 10 parts by weight or more, when the polyurethane raw material does not contain hydrophobic silica, the foam retention property is deteriorated. The lower limit of the blending amount of the hydrophobic silica is 0.6 part by weight or more, preferably 0.8 part by weight or more, and still more preferably 1 part by weight or more when the polyol component is 100 parts by weight. In addition, the upper limit of the blending amount of the hydrophobic silica is preferably 5 parts by weight or less, more preferably 4 parts by weight or less, and particularly preferably 3 parts by weight or less when the polyol component is 100 parts by weight. When the blending amount of hydrophobic silica is more than 5 parts by weight or less than 0.6 part by weight, the appearance after molding may be deteriorated.

Experimental Examples

Polyurethane foam was produced from the polyurethane raw materials of Experimental Examples 1 to 15 shown in Tables 1 and 2, and each Experimental Example was evaluated for the foaming property, the appearance after molding, the impact absorption property and the hardness.

TABLE 1

| | | Experimental Example 1 | Experimental Example 2 | Experimental Example 3 | Experimental Example 4 | Experimental Example 5 | Experimental Example 6 | Experimental Example 7 | Experimental Example 8 |
|---|---|---|---|---|---|---|---|---|---|
| Polyol component | Part by weight | 100 | 100 | 100 | 100 | 100 | 100 | 100 | 100 |
| Proportion of castor oil-based polyol | % | 40 | 40 | 40 | 40 | 40 | 40 | 40 | 40 |
| Light calcium carbonate | Part by weight | 40 | 40 | 40 | 40 | 0 | 20 | 100 | 150 |
| Heavy calcium carbonate | Part by weight | 0 | 0 | 0 | 0 | 0 | 0 | 0 | 0 |
| Particle size of calcium carbonate | μm | 3 | 3 | 3 | 3 | 3 | 3 | 3 | 3 |
| Untreated silica | Part by weight | 0 | 0 | 0 | 0 | 0 | 0 | 0 | 0 |
| Hydrophobic silica | Part by weight | 0 | 1 | 3 | 6 | 3 | 3 | 3 | 3 |
| Silica particle size | μm | — | 125 | 125 | 125 | 125 | 125 | 125 | 125 |
| Foam stabilizer | Part by weight | 10 | 10 | 10 | 10 | 10 | 10 | 10 | 10 |
| Catalyst | Part by weight | 0.1 | 0.1 | 0.1 | 0.1 | 0.1 | 0.1 | 0.1 | 0.1 |
| Forming property | | X | ○ | ○ | ○ | X | ○ | ○ | ○ |
| Density | kg/m$^3$ | 295 | 215 | 219 | 237 | 296 | 270 | 270 | 275 |
| Appearance after molding | | X | ○ | ○ | X | ○ | ○ | ○ | ○ |
| Impact absorption property | kN | 7.28 | 7.59 | 6.61 | 8.71 | 9.55 | 8.12 | 7.11 | 8.38 |
| 25% compression hardness | MPa | 0.06 | 0.03 | 0.07 | 0.02 | 0.04 | 0.04 | 0.05 | 0.04 |
| Comprehensive evaluation | | X | ◎ | ◎ | ○ | X | ○ | ◎ | ○ |

TABLE 2

| | | Experimental Example 9 | Experimental Example 10 | Experimental Example 11 | Experimental Example 12 | Experimental Example 13 | Experimental Example 14 | Experimental Example 15 |
|---|---|---|---|---|---|---|---|---|
| Polyol component | Part by weight | 100 | 100 | 100 | 100 | 100 | 100 | 100 |
| Proportion of castor oil-based polyol | % | 40 | 10 | 60 | 40 | 40 | 40 | 40 |
| Light calcium carbonate | Part by weight | 200 | 40 | 40 | 0 | 0 | 40 | 40 |
| Heavy calcium carbonate | Part by weight | 0 | 0 | 0 | 40 | 40 | 0 | 0 |
| Particle size of calcium carbonate | μm | 3 | 3 | 3 | 23 | 44 | 3 | 3 |
| Untreated silica | Part by weight | 0 | 0 | 0 | 0 | 0 | 3 | 0 |
| Hydrophobic silica | Part by weight | 3 | 3 | 3 | 3 | 3 | 0 | 0.5 |
| Silica particle size | μm | 125 | 125 | 125 | 125 | 125 | 125 | 125 |
| Foam stabilizer | Part by weight | 10 | 10 | 10 | 10 | 10 | 10 | 10 |
| Catalyst | Part by weight | 0.1 | 0.1 | 0.1 | 0.1 | 0.1 | 0.1 | 0.1 |
| Forming property | | — | ○ | ○ | X | X | X | X |

TABLE 2-continued

|  |  | Experimental Example 9 | Experimental Example 10 | Experimental Example 11 | Experimental Example 12 | Experimental Example 13 | Experimental Example 14 | Experimental Example 15 |
|---|---|---|---|---|---|---|---|---|
| Density | kg/m³ | — | 219 | 280 | 358 | 355 | 305 | 320 |
| Appearance after molding |  | — | X | ○ | ○ | ○ | X | X |
| Impact absorption property | kN | — | 9.87 | 10.70 | 7.30 | 7.10 | 7.10 | 7.46 |
| 25% compression hardness | MPa | — | 0.06 | 0.02 | 0.111 | 0.084 | 0.082 | 0.0075 |
| Comprehensive evaluation |  | X | ○ | ○ | X | X | X | X |

The components listed in Tables 1 and 2 are as follows. The blending amount of each component in the table is shown in parts by weight.

Polyol component: prepared from polyether-based polyol (product name "Sannix GP-600", manufactured by Sanyo Chemical Industries, Ltd.) and castor oil-based polyol (product name "URIC Y-406", manufactured by ITOH OIL CHEMICALS CO., LTD.). In Tables 1 and 2, the total amount of the polyol component including the polyether-based polyol and the castor oil-based polyol is 100 parts by weight.

Polyisocyanate component: product name "FOAMLITE MI", manufactured by BASF INOAC Polyurethane Co., Ltd., (the isocyanate index is 105)

Foam retention agent: (1) untreated silica (hydrophilic base silica not subjected to hydrophobic treatment): manufactured by Tosoh Silica Corporation, product name "Nipsil KQ" (M value is 0%); and (2) hydrophobic silica (silica subjected to hydrophobic treatment): wet silica, manufactured by Tosoh Silica Corporation, product name "Nipsil SS-80K" (M value is 45%)

Foam stabilizer: organic silicone-based surfactant, product name "L-5614" manufactured by Momentive, 10 parts by weight Catalyst: tin 2-ethylhexanoate, 0.1 part by weight Light calcium carbonate: product name "Silver W" manufactured by Shiraishi Kogyo Kaisha, Ltd.

Heavy calcium carbonate: product name "BF200" manufactured by BIHOKU FUNKA KOGYO CO., LTD. (Experimental Example 12), and product name "S Tankal" manufactured by ASAHI KOHMATSU CO., LTD. (Experimental Example 13)

Antioxidant: product name "IRGANOX 1135" manufactured by BASF Japan Ltd., 0.13 part by weight Moisture absorbent: product name "Molecular Sieve 3 A POWDER" manufactured by UNION SHOWA K.K., 2.69 parts by weight In Tables 1 and 2, the particle size of calcium carbonate is the average particle size [μm] of the light or heavy calcium carbonate used in each Experimental Example. This average particle size is a particle size in which the volume-based cumulative fraction is 50% in the particle size distribution obtained by the laser diffraction and scattering method according to JIS R1629-1997 (the specific surface area is determined by the air permeation method according to JIS M8511:2014). The silica particle size is the average particle size [μm] of the untreated silica or hydrophobic silica used in each Experimental Example. This average particle size is a particle size in which the volume-based cumulative fraction is 50% in the particle size distribution obtained by a Coulter multisizer (manufactured by Beckman Coulter Inc. using an aperture tube having a diameter of 30 μm). In detail, a small amount of untreated silica or hydrophobic silica was added to about 0.5 ml of ethanol and was ultrasonically dispersed, and about 20 ml of an electrolytic solution (ISOTON-2, manufactured by Beckman Coulter Inc.) was added. The obtained mixture was ultrasonically dispersed for 40 seconds, and the particle size distribution of the dispersion was measured.

In the production of the polyurethane foam, a polyurethane raw material was discharged onto a carrier film continuously fed at a speed of 1 m/min to 15 m/min to form a foam sheet having a thickness of 0.2 mm to 10.0 mm. Dry air was used as the gas for foaming, and the gas was injected at a flow rate in a density of 150 kg/m³ to 700 kg/m³.

As for the evaluation of the foaming property, specifically, after stirring the polyurethane raw material and isocyanate with a hand mixer for 2 minutes while enclosing air, a case where the density (apparent density) of the cured sample was less than 290 kg/m³ was evaluated as "○" (more preferably 280 kg/m³ or less), and a case where the density (apparent density) of the cured sample was 290 kg/m³ or more was evaluated as "x". As for the evaluation of the appearance after molding, the molded sample was visually checked, a case where the surface is smooth and there are no pinholes or voids was evaluated as "○" and a case where the surface of the molded sample is rough or pinholes or voids are generated was evaluated as "x". A case where the raw material became a paste and could not be molded was marked as "-".

The evaluation method for the impact absorption property was carried out by an impact test conforming to the CE standard EN1621. Specifically, a sample having a thickness of 20 mm was prepared, and a 5 kg iron ball was dropped from a height of 1 m above the sample at room temperature of 23° C. Then, the impact transmitted under the sample was measured by an impact sensor, and the impact absorption property was evaluated based on the measured value.

The hardness was evaluated by 25% compression hardness (25% compression load deflection (CLD)). The 25% compression hardness was tested based on the D method of JIS K6254:2010. In the test, a cylindrical polyurethane foam with a diameter of 50 mm was used as a test sample, and the entire surface of the polyurethane foam, i.e., a circular pressing surface having a diameter of 50 mm was pressed, and the polyurethane foam was compressed at a speed of 1.0 mm/min in the axial direction until a compression strain of 30% of the axial length before compression was generated (until the axial length reached 70% of that before compression). At this time, the relationship between compression force and compressive strain (compression force-deformation curve) was recorded, and from this relationship (curve), the compression force (N) when the compression strain was 25% of the axial length of the polyurethane foam before compression (when the axial length was 75% of that before compression) was obtained. Then, the compression force was divided by the cross-sectional area (that is, the area of the pressing surface: $25 \times 25 \times \pi (\text{mm}^2)$) of the polyurethane foam to calculate the 25% compression hardness (MPa) (Equation (β)). In this test, repeated compression (precompression) of the polyurethane foam was not performed.

25% compression hardness=compression force when compression strain is 25%/cross-sectional area of polyurethane foam (β)

In the comprehensive evaluation, those with poor (x or -) foaming property were evaluated as "x", among those with good (○) foaming property, those with good (○) appearance after molding and impact absorption property (measured value of impact sensor) of 8 kN or less were evaluated as "⊚", and otherwise "○".

As is clear from the results in Tables 1 and 2, when the amount of the light calcium carbonate is less than 10 parts by weight based on 100 parts by weight of the polyol component (Experimental Example 5), the foaming property is poor (x). The main reason is considered to be that when the blending amount of the light calcium carbonate is small, the absolute amount of a nucleating agent in the raw material is reduced and foaming is deteriorated.

In addition, when the heavy calcium carbonate is contained instead of the light calcium carbonate, the foaming property is poor (x) (Experimental Examples 12 and 13).

Even when the blending amount of the light calcium carbonate is 10 parts by weight or more, when the hydrophobic silica is not contained (Experimental Examples 1 and 14), the foaming property and the appearance after molding are poor (x). In addition, when the untreated silica (that is, hydrophilic silica) not subjected to a hydrophobic treatment is contained instead of the hydrophobic silica (Experimental Example 14), the foaming property and the appearance after molding are poor (x). Thus, it is considered that when hydrophobic silica is contained, in addition to the foaming action as a nucleating agent, the foam-stabilizing property is improved and the foam retention property is improved.

In addition, when amount of the light calcium carbonate is more than 140 parts by weight based on 100 parts by weight of the polyol component (Experimental Example 8), the impact absorption property is slightly lowered. It is considered that this is because the foam retention property is slightly deteriorated when the blending amount of the light calcium carbonate is large. Further, when the blending amount of the light calcium carbonate is 200 parts by weight or more (Experimental Example 9), the raw material becomes a paste and stirring is difficult.

Therefore, when the hydrophobic silica is contained as the foam retention agent, foam formation is facilitated even when the light calcium carbonate is contained as the functional filler. When the blending amount of the light calcium carbonate is 10 parts by weight or more and 140 parts by weight or less based on 100 parts by weight of the polyol component (Experimental Examples 2, 3 and 7), the impact absorption property is 8 kN or less, and a high impact absorption property is exhibited. Even when the blending amount of the light calcium carbonate is 10 parts by weight or more and 140 parts by weight or less, when the blending amount of the hydrophobic silica is more than 5 parts by weight (Experimental Example 4), the appearance after molding is deteriorated. It is considered that the deterioration in the appearance after molding is caused by the deterioration of the curing property when the blending amount of the hydrophobic silica is large. In addition, when the blending amount of the hydrophobic silica is less than 0.6 part by weight (Experimental Example 15), the appearance after molding is also deteriorated.

Experimental Examples 2 to 4, 6 to 8, 10 and 11 in Tables 1 and 2 correspond to "Examples", and Experimental Examples 1, 5, 9, 12 to 15 correspond to "Comparative Examples".

Hereinafter, the feature groups extracted from the above-described embodiments and experimental examples will be described while showing effects and the like as necessary.

[Feature 1]

A polyurethane foam obtained from a polyurethane raw material containing a polyol component and a polyisocyanate component, and a gas for foaming, wherein the polyurethane raw material contains a hydrophobic silica as a foam retention agent for retaining a foam and a light calcium carbonate, and in the polyurethane raw material, a blending amoutn of the light calcium carbonate is 10 parts by weight or more and 180 parts by weight or less and a blending amount of the hydrophobic silica is 0.6 part by weight or more, based on 100 parts by weight of the polyol component.

[Feature 2]

The polyurethane foam according to feature 1, in which the hydrophobic silica is silica subjected to a surface treatment with a silicone oil.

[Feature 3]

The polyurethane foam according to feature 1 or 2, in which a methanol wettability of the hydrophobic silica is 40% or more, or a DBA adsorption amount of the hydrophobic silica is 60 mmol/kg or less.

[Feature 4]

The polyurethane foam according to any one of features 1 to 3, in which in the polyurethane raw material, the blending amount of the light calcium carbonate is 140 parts by weight or less and the blending amount of the hydrophobic silica is 0.8 part by weight or more and 5 parts by weight or less, based on 100 parts by weight of the polyol component.

[Feature 5]

The polyurethane foam according to any one of features 1 to 4, in which an apparent density is 280 kg/m$^3$ or less.

[Feature 6]

The polyurethane foam according to any one of features 1 to 5, in which the polyurethane foam has an impact absorption property that, when an impact energy of 50 J is vertically applied to a front side of the polyurethane foam formed into the sheet shape having a thickness of 20 mm, an impact force transmitted to a back side of the polyurethane foam is less than 8 kN.

[Feature 7]

A method for producing the polyurethane foam according to any one of features 1 to 6, in which the polyurethane foam from the polyurethane raw material and the gas for foaming by using a mechanical froth method.

The polyurethane foams according to features 1 to 7 can be obtained from a polyurethane raw material containing a polyol component and a polyisocyanate component, and a gas for foaming. Since the polyurethane raw material contains the light calcium carbonate as a functional filler, the impact absorption property of the polyurethane foam can be improved. In addition, since the polyurethane raw material contains the hydrophobic silica as a foam retention agent for retaining the foam, the foam retention property is improved and the foam is easily formed when forming the polyurethane foam by the mechanical froth method.

Here, the polyurethane raw material preferably contains 10 parts by weight or more and 140 parts by weight or less of the light calcium carbonate, and 0.8 part by weight or more and 5 parts by weight or less of the hydrophobic silica based on 100 parts by weight of the polyol component (Feature 4). When the content of the light calcium carbonate is less than parts by weight or the hydrophobic silica is not contained, the foaming property when the polyurethane raw material and the gas for foaming are mixed and stirred is deteriorated. When the content of the hydrophobic silica is more than 5 parts by weight, the stirring property is good, but the curing property is deteriorated (curing is insufficient), and the appearance after molding may be deteriorated. In addition, when the content of the light calcium carbonate is more than 140 parts by weight, the impact absorption property may be lowered. It is considered that this is because the foam retention property is slightly deteriorated when the blending amount of the light calcium carbonate is large. Further, when the blending amount of the light calcium carbonate is 200 parts by weight or more, the raw material becomes a paste and stirring is difficult.

The impact absorption property of the polyurethane foam is preferably that, when an impact energy of 50 J is vertically applied to the front side of the polyurethane foam formed into a sheet shape having a thickness of 20 mm, the impact force transmitted to the back side of the polyurethane foam is less than 8 kN (Feature 6). A polyurethane foam having such impact absorption property can be used, for example, in a protector of the CE mark standard.

As for the hardness of the polyurethane foam, the 25% compression hardness is preferably less than 0.08 MPa. A polyurethane foam having such hardness can give a good fit to the user when used for an insole or a protector.

Although the present invention has been described in detail with reference to specific examples, it is apparent to those skilled in the art that it is possible to add various alterations and modifications without departing from the spirit and the scope of the present invention.

All references cited herein are entirely incorporated.

REFERENCE SIGNS LIST

20 Hydrophobic silica
21 Base silica

The invention claimed is:

1. A polyurethane foam obtained from a polyurethane raw material containing a polyol component and a polyisocyanate component, and a gas for foaming, wherein
the polyurethane raw material contains a hydrophobic silica as a foam retention agent for retaining a foam and a light calcium carbonate, and
in the polyurethane raw material, a blending amount of the light calcium carbonate is 20 parts by weight or more and 180 parts by weight or less and a blending amount of the hydrophobic silica is 0.6 part by weight or more and 6 parts by weight or less, based on 100 parts by weight of the polyol component.

2. The polyurethane foam according to claim 1, wherein the hydrophobic silica is silica subjected to a surface treatment with a silicone oil.

3. The polyurethane foam according to claim 1, wherein a methanol wettability of the hydrophobic silica is 40% or more, or a DBA adsorption amount of the hydrophobic silica is 60 mmol/kg or less.

4. The polyurethane foam according to claim 1, wherein in the polyurethane raw material, the blending amount of the light calcium carbonate is 40 parts by weight or more and 150 parts by weight or less and the blending amount of the hydrophobic silica is 0.8 part by weight or more and 5 parts by weight or less, based on 100 parts by weight of the polyol component.

5. The polyurethane foam according to claim 1, wherein an apparent density is 280 kg/m$^3$ or less.

6. The polyurethane foam according to claim 1, wherein the polyurethane foam has an impact absorption property that, when an impact energy of 50 J is vertically applied to a front side of the polyurethane foam formed into the sheet shape having a thickness of 20 mm, an impact force transmitted to a back side of the polyurethane foam is less than 8 kN.

7. A method for producing the polyurethane foam according to claim 1, wherein
the polyurethane foam from the polyurethane raw material and the gas for foaming by using a mechanical froth method.

8. The polyurethane foam according to claim 1, wherein the light calcium carbonate has a particle size of 0.08 μm to 5.0 μm.

9. The polyurethane foam according to claim 1, wherein the polyol component contains a castor oil-based polyol of 20 mass % to 80 mass % based on the entire polyol component.

10. The polyurethane foam according to claim 1, wherein the polyurethane raw material contains a moisture absorbent.

11. An impact absorbing material comprising the polyurethane foam according to claim 1.

12. A polyurethane foam obtained from a polyurethane raw material containing a polyol component and a polyisocyanate component, and a gas for foaming, wherein
the polyurethane raw material contains a hydrophobic silica as a foam retention agent for retaining a foam and a light calcium carbonate,
in the polyurethane raw material, a blending amount of the light calcium carbonate is 10 parts by weight or more and 180 parts by weight or less and a blending amount of the hydrophobic silica is 0.6 part by weight or more, based on 100 parts by weight of the polyol component, and
the polyol component contains a castor oil-based polyol of 20 mass % to 80 mass % based on the entire polyol component.

* * * * *